July 7, 1936.  W. F. RICHARDSON  2,046,926
AUTOMATIC CAMERA APERTURE
Filed Feb. 28, 1936  4 Sheets-Sheet 1

Inventor
W. F. Richardson
By Clarence A. O'Brien and Hyman Berman
Attorneys

July 7, 1936.  W. F. RICHARDSON  2,046,926
AUTOMATIC CAMERA APERTURE
Filed Feb. 28, 1936   4 Sheets-Sheet 2
Fig. 2.
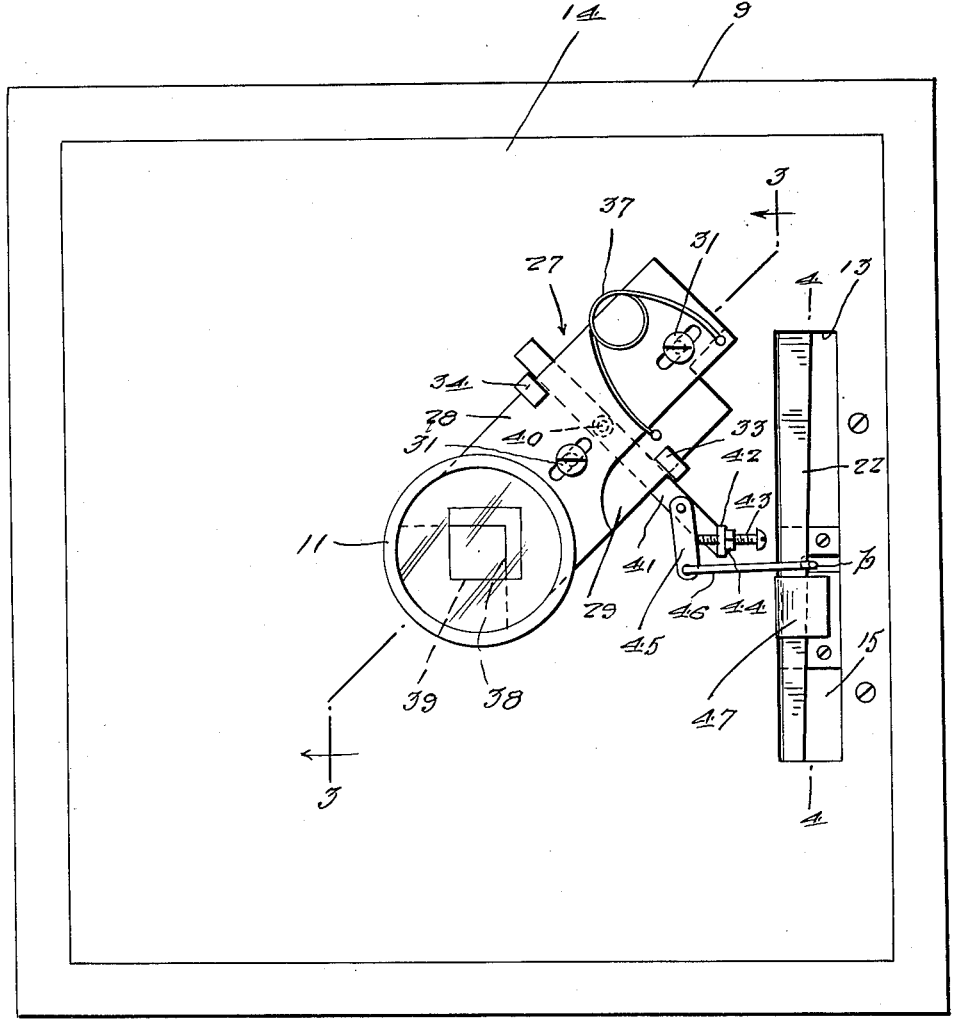
Fig. 7.   Fig. 9.
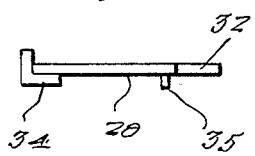 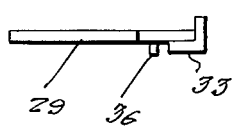
Inventor
W. F. Richardson
By Clarence A. O'Brien and
Hyman Berman
Attorneys July 7, 1936. W. F. RICHARDSON 2,046,926
AUTOMATIC CAMERA APERTURE
Filed Feb. 28, 1936 4 Sheets-Sheet 3
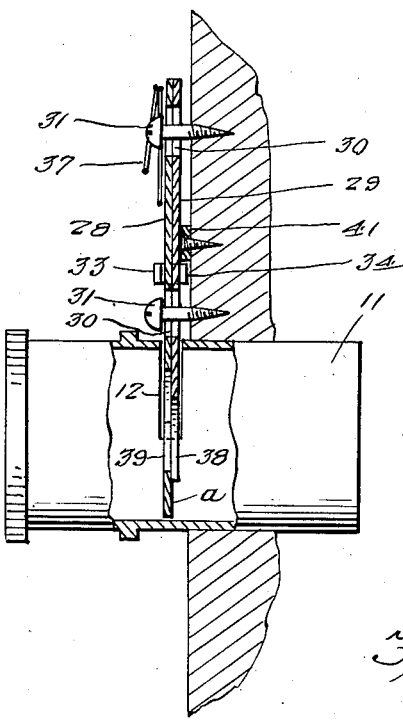
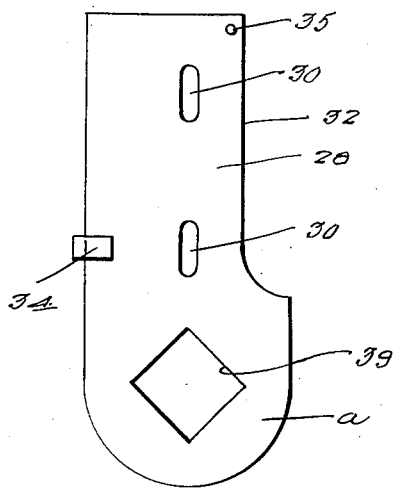
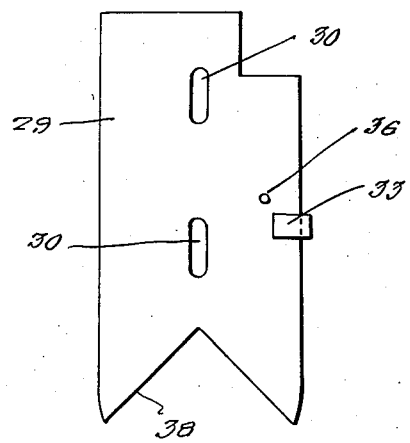
Inventor
W. F. Richardson
By Clarence A. O'Brien and
Hyman Berman
Attorneys July 7, 1936.  W. F. RICHARDSON  2,046,926
AUTOMATIC CAMERA APERTURE
Filed Feb. 28, 1936   4 Sheets—Sheet 4
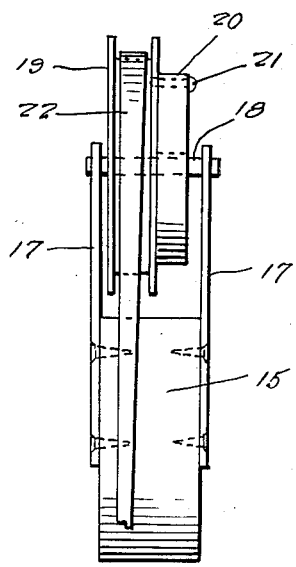
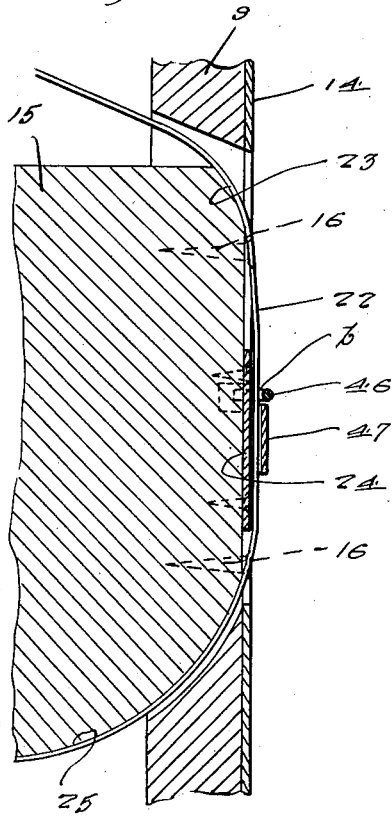
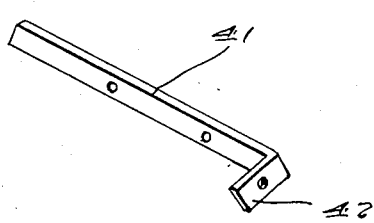
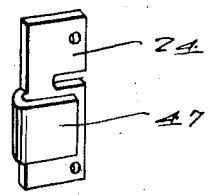
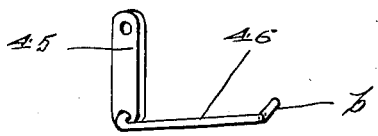
Inventor
W. F. Richardson
By Clarence A. O'Brien and
Hyman Berman
Attorneys Patented July 7, 1936

2,046,926

UNITED STATES PATENT OFFICE 2,046,926

AUTOMATIC CAMERA APERTURE

William F. Richardson, Aurora, Mo., assignor of twenty-five per cent to Johnnie K. Burney and twenty-five per cent to Charles S. Martz, Aurora, Mo.

Application February 28, 1936, Serial No. 66,294

5 Claims. (Cl. 95—64)

This invention relates to new and useful improvements in photography and more particularly to an automatic aperture unit particularly for photo-engraving cameras, which is especially designed for the making of half-tone negatives for newspapers and other publications. The ordinary camera makes the half-tone negatives by the use of a round aperture, however on different applications a square aperture is slipped into the lens barrel to take the place of the round aperture. This is adopted in order to increase the contrast on certain copies which originally have not enough contrast. It is highly desirable on the account of coarse screens that all newspaper half-tones should be increased in contrast.

The principal object of the present invention is to provide a device of the character stated which will materially increase quality of newspaper half-tone work, as well as materially decrease the time required in producing the half-tone, as a plate printed from negatives made using this device are etched to a sufficient depth with a one bite etch rather than the double and sometimes three ordinarily employed in this process.

Another important object of the invention is to provide an aperture unit for cameras which is governed in expansion or contraction in direct proportion to the camera extension.

Other important objects and advantages of the invention will become apparent to the reader of the following specification.

In the drawings:

Figure 2 represents a front elevational view of the camera.

Figure 3 represents a fragmentary vertical sectional view taken substantially on line 3—3 of Figure 2.

Figure 4 is a fragmentary vertical sectional view taken substantially on line 4—4 of Figure 2.

Figure 5 represents a top plan view of the spool and tape removed from the camera.

Figure 6 is a plan view of one of the aperture assembly plates.

Figure 7 is an end elevational view of the plate shown in Figure 6.

Figure 8 represents a plan view of the complementary aperture plate.

Figure 9 represents an end elevational view of the plate shown in Figure 8.

Figure 10 is a perspective view of the rocker.

Figure 11 represents a perspective view of the connecting link.

Figure 12 is a perspective view of the taper tape guide.

Figure 1:
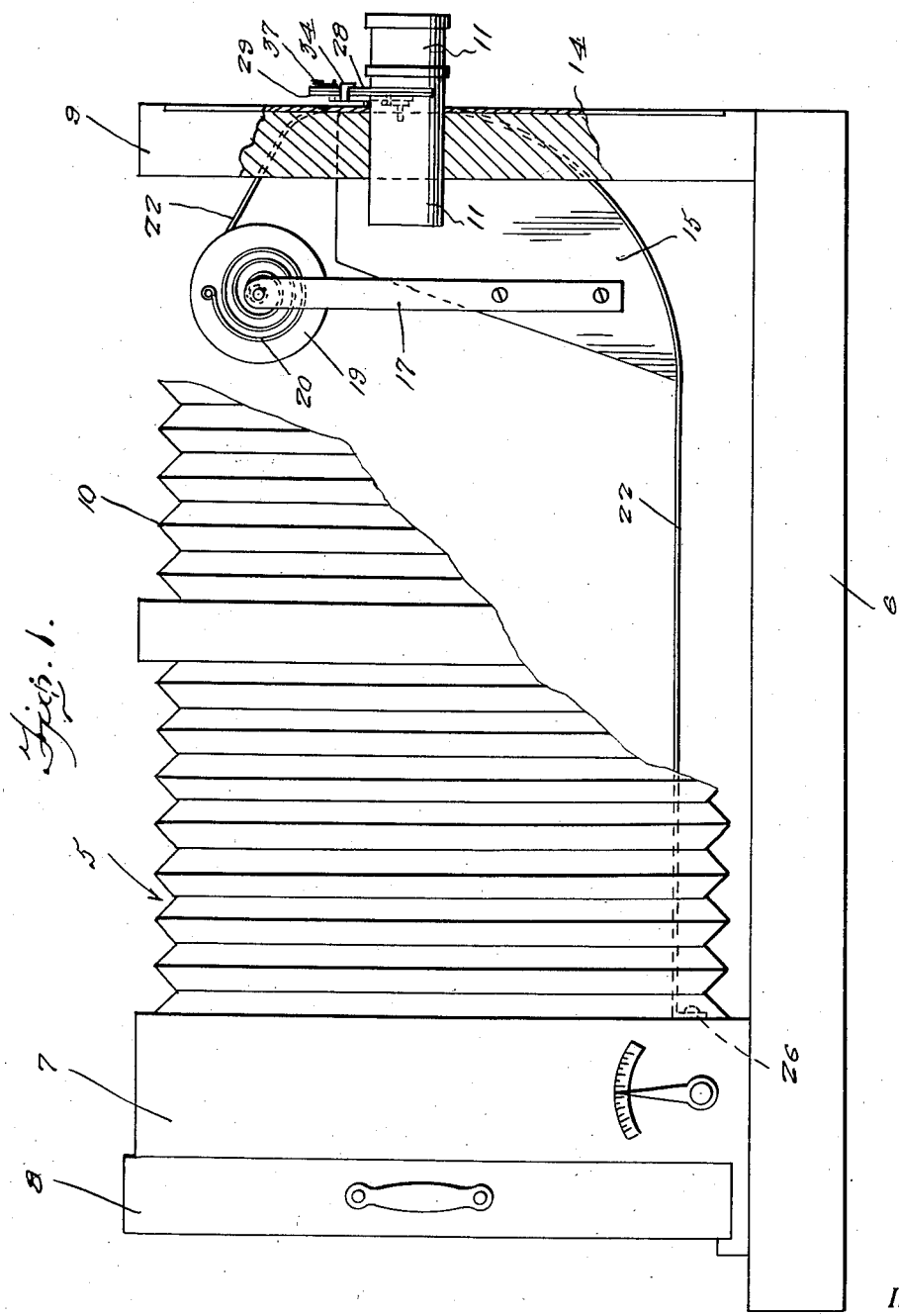
Figure 1 represents a fragmentary side elevational view of the improved camera partly in section.

Referring to the drawings wherein like numerals designate like parts, it can be seen in Figure 1 that numeral 5 generally refers to the camera construction which includes the base 6, the slidable box 7, a plate holder 8, and the front wall 9 at the forward end of the base 6. This front wall 9 is fixed on the base 6 (not shown) and is connected to the forward end of the bellows 10 which projects forwardly from the box 7.

Numeral 11 is the lens tube which extends through the front wall 9 and as shown in Figure 3, the lens tube 11 is provided with a slot 12 extending downwardly through the same for approximately one hundred and eighty degrees of the circumference of the barrel.

As is clearly shown in Figure 2, an elongated vertically extending opening 13 is provided in the front wall 9 as well as the plate 14 which covers the major portion of the front side of the wall 9 and into this projects the block 15 which is secured to the front wall 9 by suitable screws 16. Upstanding posts 17 are secured to the block 15 and have the end portions of a shaft 18 disposed through the upper ends thereof. A drum 19 is rotatably mounted on the shaft 18 while convoluted around the shaft 18 is the spiral strip spring 20, one end of which is attached as at 21 to the drum 19 and the other end to the shaft 18. Numeral 22 represents an elongated longitudinally tapered tape adapted to be maintained wound on the drum 19 by the said strip spring 20. This tape extends through the upper portion of the opening 13, down the curved portion 23 of the block 15 across the guide plate 24 which is secured to the front side portion of the block 15, and then downwardly and under the block 15 and against the curved surface 25 thereof as shown in Figure 4 to extend rearwardly and attach to the box 7 as at 26.

Now referring to the aperture unit generally referred to by numeral 27, it can be seen that this unit consists of the plates 28 and 29. The plates are elongated and each is provided with a pair of slots 30—30 therein and screws are disposed through these slots as designated in Figure 3 by numeral 31 for slidably connecting the plates together. The plate 28 is provided with a cutaway portion 32 so as to expose a portion of the plate 29 and more specifically the portion carrying the outstanding lug 33. Opposite this lug 33 and on the opposite longitudinal edge portion of the plate 28 is a complementary lug 34. The plates 28 and 29 are provided with small openings 35—36 for receiving the ends of the wire springs 37 which serve to equalize the position of these plates with respect to each other. The plate 29 is provided with a V-shaped cutout 38 of an angle of ninety degrees, while the enlarged end portion a of the plate 28 is provided with a square opening 29 therein. The plate 28 rides over the plate 29 as suggested in Figure 2 and when adjustment is made of these plates the opening in the form of a square can be increased to the full size of the square opening 39 or decreased to any smaller size square opening.

Underlying the plate 29 and pivotally connected as at 40 to the front wall 9 of the camera is the rocker 41 which is provided with an outwardly disposed foot 42 having the set screw 43 feedable therethrough. This set screw 43 is provided with a jamb nut 44. A link member 45 is pivotally connected at one end to the rocker arm 41 and its other end is connected to the tape rider 46 which is in the form of an elongated wire member provided with a laterally disposed foot b for riding engagement with the cam edge of the tape 22.

Thus it can be seen that when the wall 9 is extended forwardly, a pull is exerted on the tape 22 which pulls it from the drum 19 and as this tape rides along the rider 46, a pull is exerted on the same which swings the rocker arm 41 so as to cause portions thereof at opposite sides of the pivot point 40 to bear against the lugs 33—34 and cause the plates to move in opposite directions to the end that the sides of the opening will be increased to any size up to the full size opening 39

As is shown in Figure 12, an outwardly disposed hook shaped lug 47 is provided on the guide plate 24 for engaging over the tape and retaining the same in proper relation with respect to the foot b of the rider 46.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

1. In combination, a camera provided with a photographic plate box, a movable lens carrier, a bellows between the lens carrier and the box, a lens barrel, a pair of plates, one of said plates being provided with a square opening therein, the other plate being provided with a V-shaped cutout portion ridable over the square opening of the complementary plate, and means responsive to the movement of the lens carrier for shifting these plates to entirely open the square opening or partly reducing the same in size.

2. In combination, a camera provided with a photographic plate box, a movable lens carrier, a bellows between the lens carrier and the box, a lens barrel, a pair of plates, one of said plates being provided with a square opening therein, the other plate being provided with a V-shaped cut-out portion ridable over the square opening of the complementary plate, and means responsive to the movement of the lens carrier for shifting these plates to entirely open the square opening or partly reducing the same in size, said means consisting of an elongated tape secured at one end to the plate box and at its opposite end to the carrier, said tape being longitudinally tapered, and a rider engageable with one edge of the tape and being operatively connected with the plates.

3. In combination, a camera provided with a photographic plate box, a movable lens carrier, a bellows between the lens carrier and the box, a lens barrel, a pair of plates, one of said plates being provided with a square opening therein, the other plate being provided with a V-shaped cut-out portion ridable over the square opening of the complementary plate, and means responsive to the movement of the lens carrier for shifting these plates to entirely open the square opening or partly reducing the same in size, said means consisting of an elongated tape secured at one end to the plate box and at its opposite end to the carrier, said tape being longitudinally tapered, a rider engageable with one edge of the tape and being operatively connected with the plates, a rocker having its fulcrum point behind the plate, a lug on each of the plates, said rocker engageable with both of the said lugs simultaneously to move the said plates in opposite direction, said rocker being operatively connected with the said tape rider.

4. In combination, a camera provided with a photographic plate box, a movable lens carrier, a bellows between the lens carrier and the box, a lens barrel, a pair of plates one of said plates being provided with a square opening therein, the other plate being provided with a V-shaped cut-out portion ridable over the square opening of the complementary plate, and means responsive to the movement of the lens carrier for shifting these plates to entirely open the square opening or partly reducing the same in size, said means consisting of an elongated tape secured at one end to the plate box and at its opposite end to the carrier, said tape being longitudinally tapered, a rider engageable with one edge of the tape and being operatively connected with the plates, a rocker having its fulcrum point behind the plate, a lug on each of the plates, said rocker engageable with both of the said lugs simultaneously to move the said plates in opposite direction, said rocker being operatively connected with the said tape rider, and a spring wound drum on the carrier for one end of the tape.

5. In combination, a camera provided with a photographic plate box, a movable lens carrier, a bellows between the lens carrier and the box, a lens barrel, a pair of plates, one of said plates being provided with a square opening therein, the other plate being provided with a V-shaped cut-out portion ridable over the square opening of the complementary plate, and means responsive to the movement of the lens carrier for shifting these plates to entirely open the square opening or partly reducing the same in size, said means consisting of an elongated tape secured at one end to the plate box and at its opposite end to the carrier, said tape being longitudinally tapered, a rider engageable with one edge of the tape and being operatively connected with the plates, a rocker having its fulcrum point behind the plate, a lug on each of the plates, said rocker engageable with both of the said lugs simultaneously to move the said plates in opposite direction, said rocker being operatively connected with the said tape rider, and guard means for the tape.

WILLIAM F. RICHARDSON.